United States Patent [19]

Kigami et al.

[11] Patent Number: 6,092,145

[45] Date of Patent: *Jul. 18, 2000

[54] DISK DRIVE SYSTEM USING SECTOR BUFFER FOR STORING NON-DUPLICATE DATA IN SAID SECTOR BUFFER

[75] Inventors: Yuji Kigami, Yamato; Kohji Yamada; Toshio Kanai, both of Moriyama; Kazuyuki Ishibashi, Yamato, all of Japan

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/576,027

[22] Filed: Dec. 21, 1995

[30] Foreign Application Priority Data

Dec. 27, 1994 [JP] Japan ..................................... 6-324715

[51] Int. Cl.[7] .............................. G06F 12/00; G06F 13/00
[52] U.S. Cl. ................................. 711/4; 711/111; 711/154
[58] Field of Search .................................... 395/404, 438, 395/439, 440, 463, 464; 711/4, 111, 112, 113, 136, 154, 159

[56] References Cited

U.S. PATENT DOCUMENTS

| 4,268,907 | 5/1981 | Porter et al. ............................ 364/200 |
|---|---|---|
| 4,394,732 | 7/1983 | Swenson .................................. 711/113 |
| 4,442,488 | 4/1984 | Hall ......................................... 395/452 |
| 4,593,354 | 6/1986 | Ushiro ................................. 395/185.01 |
| 4,598,357 | 7/1986 | Swenson et al. ....................... 711/113 |
| 4,953,122 | 8/1990 | Williams ..................................... 711/4 |
| 5,088,026 | 2/1992 | Bozman et al. ......................... 395/425 |
| 5,109,496 | 4/1992 | Begausoleil et al. .................... 711/207 |
| 5,123,099 | 6/1992 | Shibata et al. .......................... 395/447 |
| 5,285,527 | 2/1994 | Cnck et al. ............................. 395/447 |
| 5,379,391 | 1/1995 | Belsan et al. ........................... 395/400 |
| 5,526,507 | 6/1996 | Hill ........................................ 711/114 |
| 5,553,307 | 9/1996 | Fujii et al. .............................. 395/845 |
| 5,592,648 | 1/1997 | Schultz et al. ......................... 711/114 |
| 5,603,002 | 2/1997 | Hashimoto ............................. 711/113 |
| 5,623,608 | 4/1997 | Ng .......................................... 395/250 |
| 5,717,893 | 2/1998 | Mattson ................................. 711/129 |

*Primary Examiner*—Eddie P. Chan
*Assistant Examiner*—Hong Kim
*Attorney, Agent, or Firm*—Altera Law Group, LLC

[57] ABSTRACT

A disk drive system comprising a sector buffer having a plurality of segments for storing data and a controller for classifying data and for storing a portion of the classified data in a segment of a sector buffer such that said portion of the classified data stored in said segment is not stored in any other segment in the sector buffer.

4 Claims, 11 Drawing Sheets

Fig.12b NXT-HSEG-REQ

Sector address space

Fig. 14

DISK DRIVE SYSTEM USING SECTOR BUFFER FOR STORING NON-DUPLICATE DATA IN SAID SECTOR BUFFER

BACKGROUND OF THE INVENTION

1. Technical Field

The present invention relates to a method and apparatus for processing data in a disk drive, and, in particular, to a method and apparatus for reading and writing data using a segmented sector buffer.

2. Description of the Background Art

Computers use hard disk drive (HDD) systems to store large amounts of data. HDD systems comprise a plurality of magnetic storage disks (hereinafter referred to as disks) and data is stored in a concentric pattern of tracks on each disk. A magnetic head (hereinafter referred to as head) reads and writes the data on the disk. The head is positioned over a desired track when reading or writing data on the disk.

Generally, HDD systems require a memory called a sector buffer to temporarily store data in the HDD system because the data transfer rate of the disk is not equal to the data transfer rate of a host computer (hereinafter referred to as host). For example, when the host sends a read instruction to the HDD system, the HDD system stores the data read from the disk in the sector buffer. After a specified amount of data is stored in the sector buffer, the HDD system transfers the data to the host.

When the host sends a write instruction to the HDD system, the HDD system stores the data sent from the host in the sector buffer. The HDD system performs a seek to the desired track and writes the data on the target sector.

Using a sector buffer as a read ahead buffer or as a memory for a write cache for reading and writing data is a well-known technique for increasing the data I/O rate of new high capacity HDD systems. In response to a read instruction, the HDD system reads data from a sector and transfers the data. It is likely that another read instruction will be issued for the sector immediately following the sector in the preceding read request. To quickly start data transfer for the next request, it is very effective to perform, a read ahead or look ahead operation. Sector data is read in response to a first read instruction. In a read ahead or look ahead operation, the sector data immediately following the requested sector is read before the host issues a corresponding read instruction. The read ahead buffer is a memory which stores the data from the sector immediately following the requested sector.

In response to a write instruction, the HDD system writes data sent from the host to a specified sector on the disk, and informs the host when the write is finished. If the host is informed when the data transfer is finished but before the data is written to disk, from the host's view, the processing time to complete a write instruction is reduced. In a write cache, data sent from the host is stored in the sector buffer, and the host is informed of the end of a write when the data transfer to the HDD system is finished and before the write is actually finished.

Such sector buffers have increasingly large capacity due to reduced costs of memories. Therefore, a technique called segmentation wherein a sector buffer is divided into a plurality of regions (hereinafter referred to as segments) is commonly used. Using a high capacity segmented sector buffer as memory for a read ahead buffer or a write cache allows data in a plurality of sectors to be read ahead into a plurality of segments and to be write-cached in a plurality of segments.

The use of a large capacity sector buffer divided into a plurality of segments in a read or write instruction is as follows:

In response to a read instruction, the HDD system first sets a segment retaining at least part of the sector data requested by the host as a segment in the sector buffer to be processed. If a plurality of segments are associated with the request, the HDD system must attempt to identify (1) a segment retaining the data in the leading sector, (2) a segment retaining the largest part of the requested sector data, and (3) a segment that can most efficiently process the number of sectors requested. If such a segment cannot be selected (no segment retains the requested sector data), the HDD system must then attempt to identify (4) a segment least recently used, (5) a segment retaining the minimum number of sectors, and (6) a segment that can most efficiently process the number of sectors requested. If the set segment retains a specified amount or more of data (that can be transferred to the host), the HDD system then starts data transfer and reads missing sector data from the disk. The HDD system informs the host when all the requested sector data is transferred.

Similarly, in response to a write instruction, the HDD system first sets a segment in the sector buffer to be processed. Since the HDD system must update the sector data requested by the host, it must invalidate the data retained in the segment. To efficiently perform invalidation, the HDD system must identify (1) a segment retaining a minimum amount of sector data other than those requested, (2) a segment least recently used, and (3) a segment that can most efficiently process the number of sectors requested. The HDD system starts transferring a specified amount of data (sent from the host) to the set segment, writes the data to the corresponding sector on the disk, and informs the host when all the requested sector data is transferred. The HDD system subsequently finishes processing by writing all the requested sector data to the corresponding sectors on the disk.

Figure 13A:
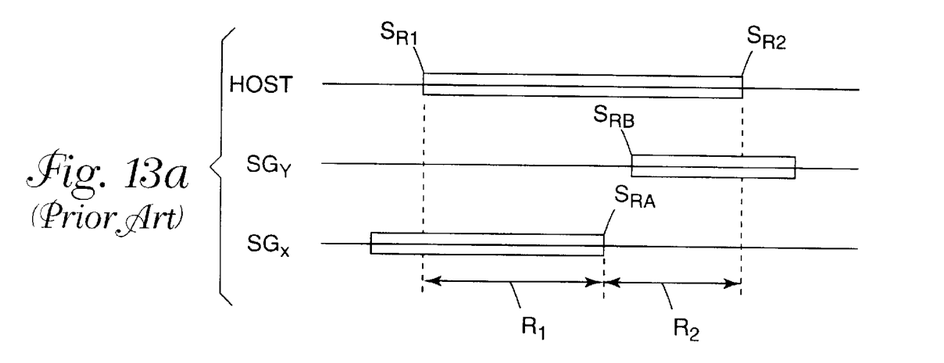
FIGS. 13a, 13b, and 13c are conceptual views of data retention in segments in response to a host instruction in a conventional HDD system
Figure 13B:
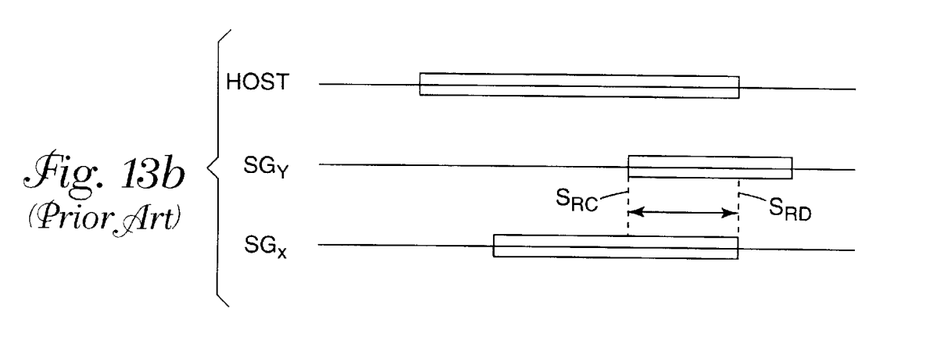

However, in conventional HDD systems, once a segment is set to be processed, the segment continues to be used until processing is complete and some sector data may be retained in a plurality of segments. Referring to FIG. 13a, if the host issues a read request for sectors $S_{R1}$ and $S_{R2}$ and part of the data is contained in segments $SG_x$ and $SG_y$, the HDD system sets segment $SG_x$, as the segment to be processed. Since segment $SG_x$, retains the data preceding $S_{RA}$, to transfer all the data, the HDD system starts transferring the sector data (indicated by arrow $R_1$) and reads missing sector data (indicated by arrow $R_2$). Referring to FIG. 13b, as a result, the data from sectors $S_{RC}$ to $S_{RD}$ is retained in both segments $SG_x$ and $SG_y$.

Figure 13C:
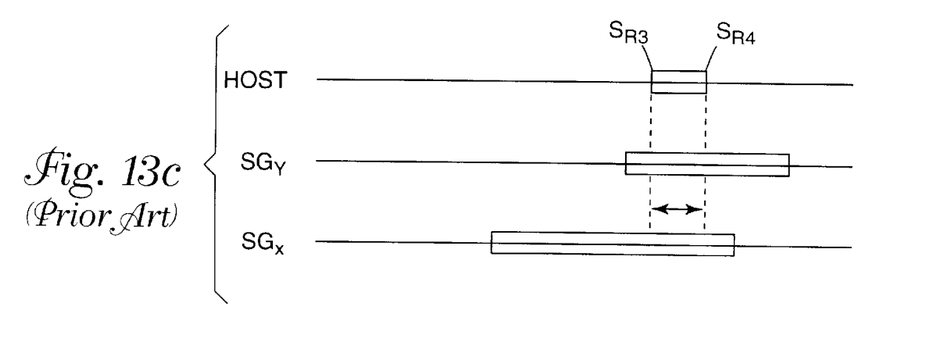

Referring now to FIG. 13c, in response to a write instruction, since the HDD system must invalidate data retained in certain segments, the HDD system must check related segments and invalidate the data retained each of the identified segments. That is, since a request from the host involves sectors $S_{R3}$ to $S_{R4}$ but both segments $SG_x$ and $SG_y$ contain the data, the data in both segments must be invalidated.

Consequently, the sector buffer is not efficiently used because the same data may exist in a plurality of segments. The HDD system must also check for segments containing data to be updated to invalidate the data retained in each of the identified segments. This results in complex processing and increases the burden on the local CPU controlling the sector buffer.

SUMMARY OF THE INVENTION

It is therefore an object of the present invention to provide a method and apparatus to process data in a disk drive that efficiently and simply transfers data at high speed.

To achieve the above object, the invention provides a method and apparatus of processing data in a disk drive for transferring data. The apparatus comprises a disk having a plurality of sectors and a sector buffer for temporarily retaining data read from and to be written to the disk. The buffer is divided into a plurality of segments, wherein data is classified and retained in at least one segment such that at least part of the data is not duplicated in the sector buffer.

Data is classified such that different data is retained in each segment.

If data to be transferred has a plurality of sectors and is retained in a plurality of segments, the data is divided and classified into a plurality of units. Each unit is retained in any one of the segments in the sector buffer.

If a part of the data to be read or written is retained in a plurality of segments, when the requested data is transferred, the process switches to the segments retaining the data to transfer the requested data.

When a segment fills during data transfer, the process switches to another segment to input or output the data.

If a part of the requested data is retained in a plurality of segments, if the requested data fills the segment, and if new data must be retained, a predetermined segment is set as the one to be processed to temporarily retain the data. The predetermined segment is used to input or output the data.

The disk drive comprises a disk, sector buffer, and segment table memory. The disk has a plurality of sectors. The sector buffer temporarily retains data read from or to be written to the disk. The sector buffer is divided into a plurality of segments. A segment table memory stores the corresponding amount of data stored in each segment in the sector buffer, positional information describing the sector containing the data, and order information describing the order of the segments in the sector buffer.

A controller retains data read from the disk in one or more segments such that at least part of the data is not duplicated in the sector buffer. The controller outputs the retained data as requested data.

The controller retains data to be written to the disk in one or more segments in the sector buffer such that at least part of the data is not duplicated in the sector buffer. The controller writes the retained data to the disk as requested data.

The controller causes each segment to retain data from different sectors.

If requested sector data is retained in a plurality of segments, the controller divides and classifies the requested data into a plurality of units. Each unit is retained in any one of the segments in the sector buffer.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode for carrying out the invention. This description and the number of alternative embodiments shown are made for the purpose of illustrating the general principle of the present invention and is not meant to limit the inventive concepts claimed herein.

According to the present invention, data is retained such that at least part of the data is not duplicated in the sector buffer. Therefore, data to be read from or written to the disk is retained in different segments in the sector buffer.

Data is classified such that each segment retains data from different sectors. Therefore, data is not duplicated within the sector buffer.

If the data to be transferred is retained in a plurality of segments, the data is divided and classified into a plurality of units. Each unit is retained in any one of the segments in the sector buffer. Therefore, even the data to be transferred is not duplicated within the sector buffer.

If a portion of the data to be transferred is retained in a plurality of segments, the process switches to and uses the segments retaining the data during data transfer. Therefore, data that is not duplicated among segments is transferred easily.

When data being processed fills a segment which retains unprocessed data, the process switches to another segment to input or output the data. Therefore, unprocessed data is protected.

If part of the data for which input or output was requested is retained in a plurality of segments, required data fills a segment, and new data must be further retained, a predetermined segment is set to temporarily retain and to input or output the data. To protect the other segments, only the single predetermined segment is updated.

This method is implemented using a disk drive, a sector buffer, and controller. The disk drive comprises an disk having a plurality of sectors. The sector buffer temporarily retains data read from or to be written to the disk. The sector buffer is divided into a plurality of segments. The segment table memory stores the corresponding size information describing the size of the data retained in each segment in the sector buffer, the positional information describing the sector containing the data, and the order information describing the order of the segments in the sector buffer.

The controller retains data read from the disk in one or more segments such that at least part of the data is not duplicated in the sector buffer, and outputs the data retained in one or more segments as requested data.

The controller retains data to be written to the disk in one or more segments such that at least part of the data is not duplicated within the sector buffer, and writes the data retained in one or more segments to the disk as requested data.

The controller causes each segment to retain data for different sectors. Therefore, data is not duplicated within the sector buffer. If the requested data is retained in a plurality of segments, the controller divides and classifies the data into units. Each unit is retained in any one of the segments in the sector buffer. Therefore, the sector data is not duplicated within the sector buffer.

An embodiment of the present invention is next described in detail with reference to the drawings.

Figure 1:
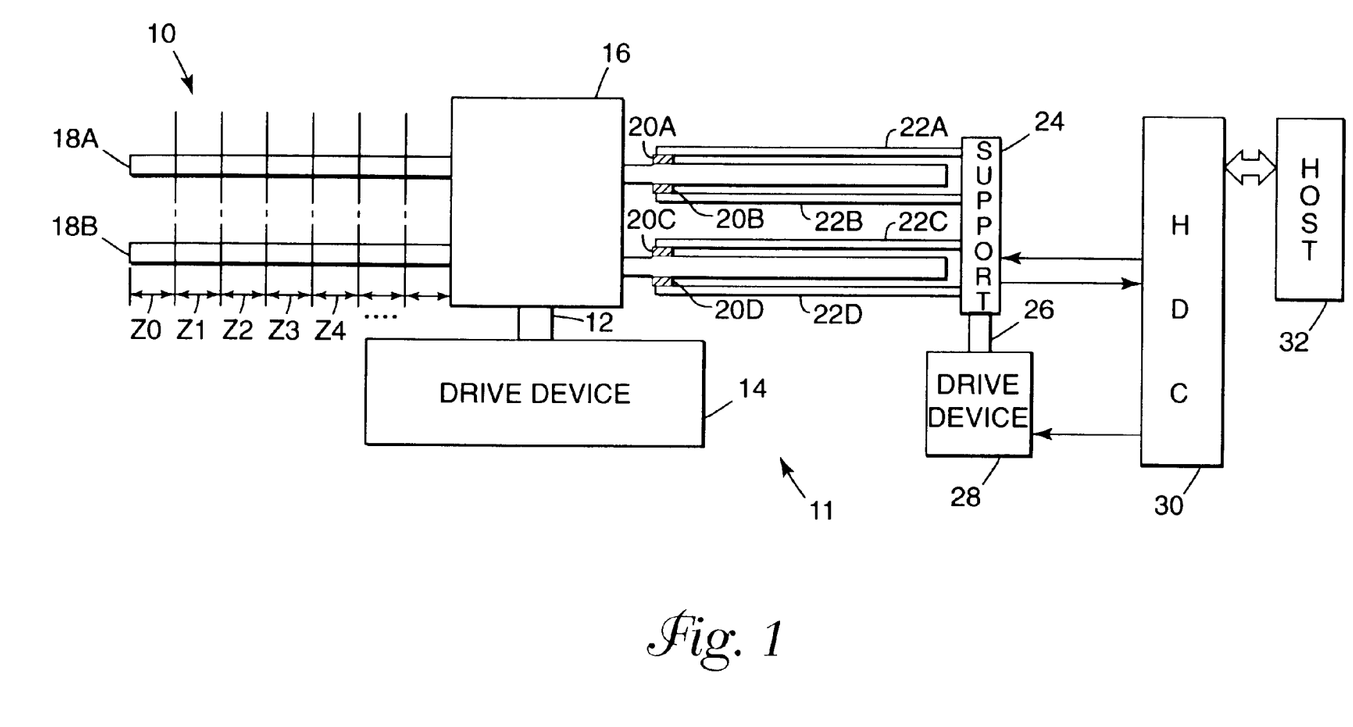
FIG. 1 is a block diagram illustrating a configuration of an HDD system.

Referring to FIG. 1, a block diagram of the approximate configuration of an HDD system is shown. The embodiment applies the present invention to an HDD system 10 that positions a head 20A, 20B, 20C, 20D relative to a magnetic storage disk 18A, 18B using a sector servo method. This invention also applies to an HDD system using a multi-zone and sector servo method.

The multi-zone method radially partitions a disk into a specified number of zones from the inner to outer circumference using specified linear densities for reading and writing data in each zone.

Referring to FIG. 1 an HDD system 10 according to the present embodiment is shown. The HDD system comprises a disk section 11 and a hard disk controller 30 (HDC). The HDC 30 comprises a microcomputer having a local CPU (not shown).

The disk section 11 comprises a drive device 14 for rotating a shaft 12 at a high speed. The shaft 12 has a cylindrical support 16 and attaches a plurality of disks 18A, 18B, at a specified interval, to the outer circumferential face of the support 16 such that their axes match. The disks 18A, 18B have a circular shape and a specified thickness. The disks 18A, 18B are formed from a hard material and each surface is coated with a magnetic material for storage. A bore is drilled in the center of the disks 18A, 18B. The bore has approximately the same diameter as the outer diameter of the support 16. The support 16 is inserted into the bore to fix the disks 18A, 18B to the outer circumferential face of the support 16. Consequently, when the drive device 14 rotates the shaft 12, the disks 18A, 18B rotate with the support 16.

Figure 2:
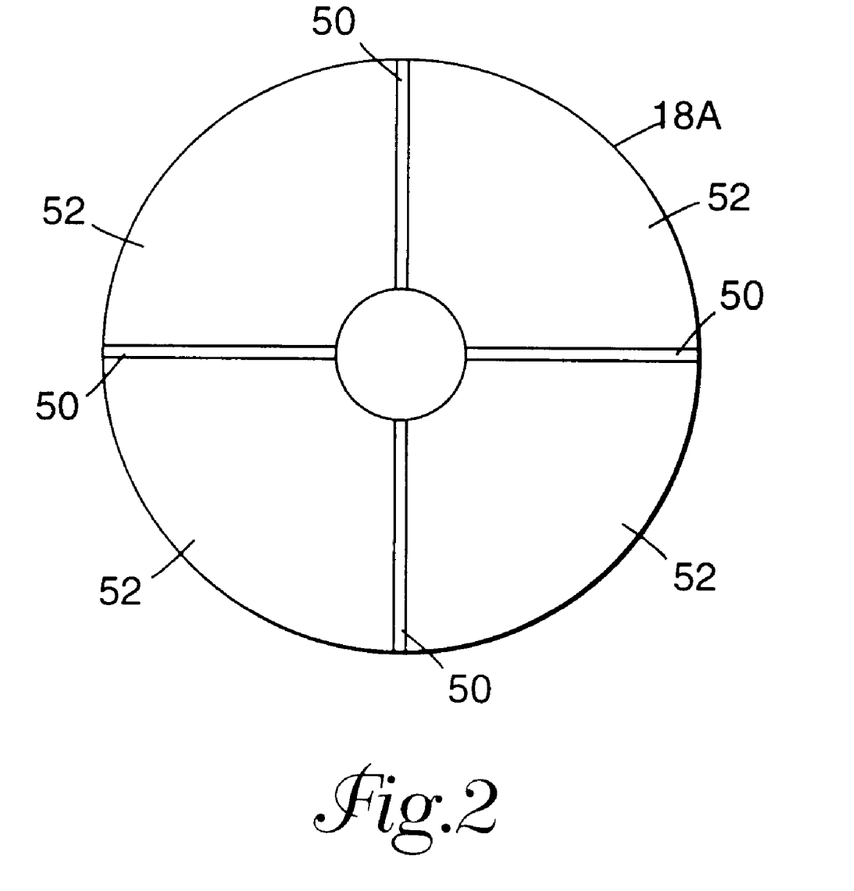
FIG. 2 is diagram of a disk of the HDD system.

Referring to FIG. 2, a plurality of servo regions 50 are radially formed on each surface of the disks 18A, 18B, (18A shown in FIG. 2) while other regions are used for storing data tracks 52. Servo signals, such as burst patterns for indicating the direction of the arrangement of data tracks, are stored in the servo regions 50. Special codes indicating the beginning of a pattern (non-signal regions of about 1 μsec) and gray codes describing the address of each data track (cyclic binary codes) are also stored in the servo regions such that the servo regions correspond to the data tracks. Information for generating a sector pulse signal SP indicating the end of a servo region 50 (the beginning of sectors) is stored at the end of a servo region in the rotational direction. A plurality of tracks are formed in concentric circles radially in data track regions 52 at pitch P.

Referring to FIG. 1, the HDD system 10 comprises heads 20A to 20D as MR heads having a specified gap width and a specified gap length corresponding to the respective storage faces of the disks 18A, 18B. In the present embodiment, the heads 20A to 20D each comprise a reproduction element for reading information and a storage element for writing information. The heads 20A to 20D are attached to the tip of access arms 22A to 22D, respectively, and are held at a distance, 0.1 to 0.2 micron for example, from the corresponding storage surface of the disks 18A, 18B. The rear ends of the access arms 22A to 22D attach to a support section 24. The support section 24 attaches to a drive device 28 via a shaft 26 such that the access arms 22A to 22D turn when the drive device 28 rotates through a specified angle. Turning the access arms 22A to 22H causes the heads 20A to 20D to radially move over the corresponding storage surface of the disks 18A, 18B until the heads are in their specified position over the storage surface.

The drive device 28 connects to the HDC 30. The HDC 30 connects to each of the heads 20A to 20D. The HDC 30 also connects to a host 32. The host 32 inputs data to be written to the disk. Data read from the disk is output to the host. The drive device 28 comprises a digital to analog converter (D/A), an amplifier (AMP), and a voice coil motor (VCM). This configuration allows the access arms 22A to 22D to be turned through a specified angle according to a signal supplied to the VCM. The signal supplied to the VCM is a digital signal, calculated by the local CPU in the HDC 30, converted to an analog signal by the D/A converter, and amplified by the AMP at a specified rate.

Figure 3:
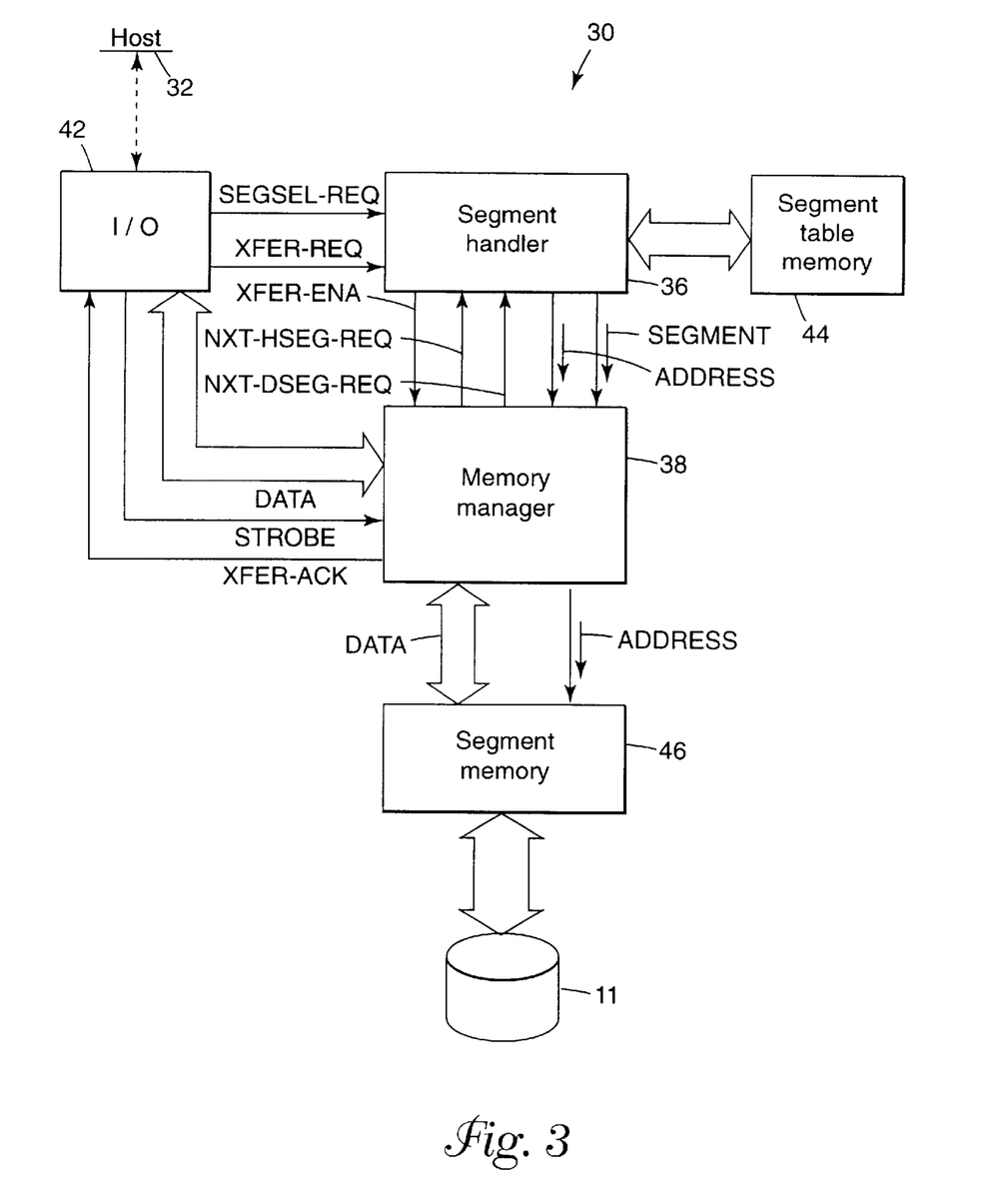
FIG. 3 is a block diagram illustrating a configuration of a hard disk controller (HDC) according to the present invention.

Referring to FIG. 3, a block diagram illustrating the approximate configuration of an HDC according to the present invention is shown. The HDC 30 comprises an I/O interface 42 (I/O) which connects to the host 32. The I/O 42 is connected to a segment handler 36 to output request signals from the host 32. The request signals include a segment selection request signal SEGSEL-REQ and a data transfer request signal XFER-REQ. The I/O 42 also connects to a memory manager 38 to input or output signals such as data from the host 32. These signals include sector data DATA, a data transfer acknowledgment signal XFER-ACK, and a strobe signal STROBE. The segment handler 36 connects to a segment table memory 44 and to the memory manager 38. The segment table memory 44 stores a segment table. The segment handler 36 and the memory manager 38 are connected. The following signals are output from the segment handler 36 to the memory manager 38: a segment signal SEGMENT describing a segment to be used, a signal describing an address ADDRESS to be used, a data transfer enabling signal XFER-ENA are output from the segment handler 36. The following request signals are output from the memory manager 38 to the segment handler 36: NXT-HSEG-REQ and NXT-DSEG-REQ. The request signal NXT-HSEG-REQ determines the segment to be used for the next sector of the host. The request signal NXT-DSEG-REQ determines a segment to be used for the sector of a disk. The memory manager 38 connects to the disk section 11 via a segment memory 46. The segment memory 46 is divided into a plurality of segments.

Figure 4:
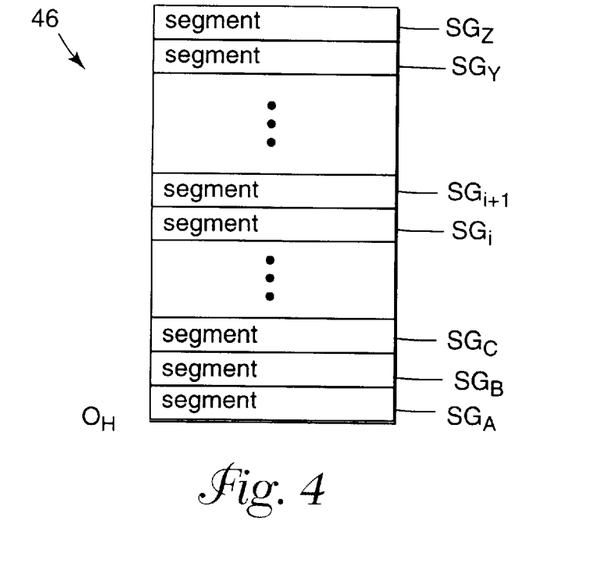
FIG. 4 is a diagram of the internal configuration of segment memory in the HDC.

Referring now also to FIG. 4, a diagram of the internal configuration of segment memory 46 is shown. In the present embodiment, the segments are labeled $SG_A$ to $SG_Z$.

Segment table memory 44 stores a segment table as shown in Table 1. The segment table stores a list of information for each segment in the segment memory 46 and is referenced or updated by the HDC 30 as required.

TABLE 1

| SEGMENT | SEGMENT DEFINITION | LBA RANGE | LBA STRING | LRU STRING | PROTECT FLAG |
|---|---|---|---|---|---|
| $SG_A$ | 0000–1FFF | $ELBA_A$ | F:R | B:β | o |
| $SG_B$ | 2000–3FFF | $ELBA_B$ | G:α | C:A | x |
| . | . | . | . | . | . |
| . | . | . | . | . | . |
| . | . | . | . | . | . |
| $SG_Z$ | 8000–9FFF | $ELBA_Z$ | α:E | β:Y | x |

The segment table stores for each segment, the definition of each segment (SEGMENT DEFINITION), the range of retained sectors (LBA RANGE), an LBA order identification code (LBA STRING), an LRU order identification code (LRU STRING), and a write protect flag (PROTECT FLAG).

The SEGMENT DEFINITION identifies a range available for the segment in the segment memory 46, and is used to determine the capacity of the segment.

The LBA RANGE describes the range of the addresses of the sectors retained in the segment. The addresses of the retained sectors are logical block addresses (LBAs). The LBA RANGE is updated when data is output from the host or when data is read from the disk.

The LBA STRING is used to arrange the segments in the LBA order. The LBA STRING consists of two items: a previous LBA identification code (PREV.LBA.SEG) and a next LBA identification code (NEXT.LBA.SEG). The PREV.LBA.SEG describes a segment immediately preceding a segment in LBA order. A code representing a dummy segment (α in Table 1) is stored to describe the first segment. The NEXT.LBA.SEG describes a segment immediately following a segment in LBA order. A code representing a dummy segment (α in Table 1) is stored to describe the last segment. Consequently, when the segments are arranged using the LBA identification codes, a loop is created beginning with a dummy segment α and ending with a dummy segment α. The LBA identification codes are updated when the LBA order is changed.

The LRU STRING is used to arrange the segments in least-recently-used (LRU) order. The LRU STRING consists of two items: a previous LRU identification code (PREV.LRU.SEG) and a next LRU identification code (NEXT.LRU.SEG). The PREV.LRU.SEG describes the segment immediately preceeding a segment in LRU order. A code representing a dummy segment (β in Table 1) is stored to describe the first segment. The NEXT.LRU.SEG describes the segment immediately following a segment in LRU order. A code representing a dummy segment (β in Table 1) is stored to describe the last segment. Consequently, when the segments are arranged using LRU identification codes, a loop is created beginning with a dummy segment β and ending with a dummy segment β. The LRU identification code is updated when the LRU order is changed.

The write protect flag (PROTECT FLAG) indicates whether a segment retains unwritten data. The PROTECT FLAG is set when the host transfers data to be written ("o" in Table 1). The PROTECT FLAG is reset when the data is written to a disk ("x" in Table 1).

Figure 5:
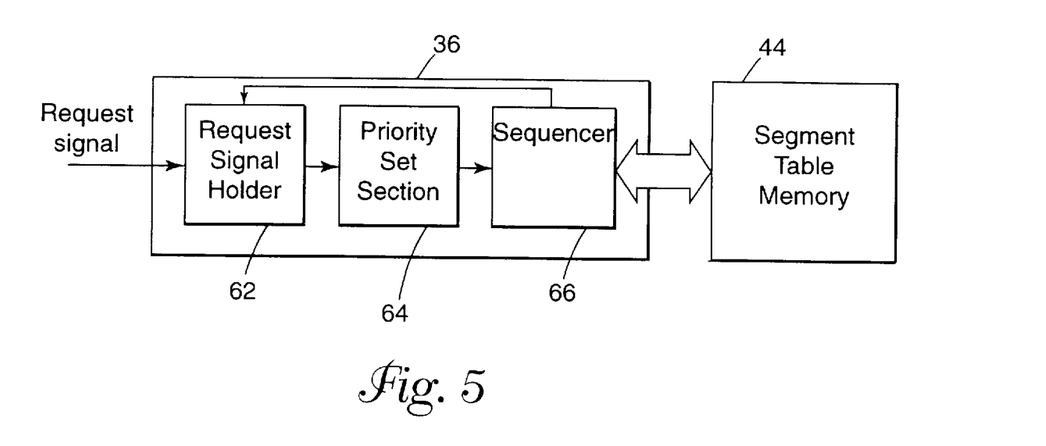
FIG. 5 is a diagram of the segment handler configuration in an HDC.

Referring now to FIG. 5, a conceptual view of a segment handler is shown. The segment handler 36 connects to the segment table memory 44. The segment handler 36 comprises a request signal holder 62, a priority set section 64, and a sequencer 66. The request signal holder 62 temporarily retains a request signal occurring in the host 32 or the segment handler 36. The priority set section 64 determines the priority among a plurality of requests. A sequencer 66 stores the various rules required to reference the segment table and to receive data from segment memory.

Request signals input to the request signal holder 62 of the segment handler 36 include a segment selection request signal (SEGSEL-REQ), a data transfer request signal (XFER-REQ), an LBA ordering request signal (LBASTR-REQ), an LRU ordering request signal (LRUSTR-REQ), a request signal for determining a segment to be used for the next sector of a disk (NXT-DSEG-REQ), and a request signal for determining a segment to be used for the next sector of the host (NXT-HSEG-REQ).

Figure 6:
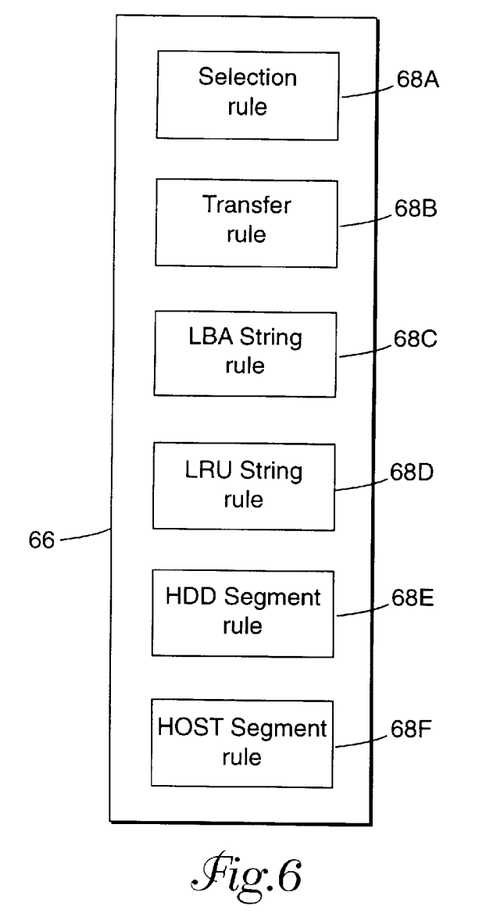
FIG. 6 is a diagram of the internal configuration of the segment handler.

Referring to FIG. 6, the internal configuration of the segment handler is shown. The sequencer 66 has various rule sections 68A to 68F as substantial processing sections for receiving data for each segment based on fundamental principles.

The segment selection rule section (SELECTION RULE) 68A incorporates rules for referencing the segment table to check for segments retaining the sector data requested by the host 32, so the same sector data will not be placed in a plurality of segments.

The transfer rule section (TRANSFER RULE) 68B incorporates rules for changing a segment to be used during a process if the data requested by the host 32 is retained in a plurality of segments.

The LBA ordering rule section (LBA STRING RULE) 68C incorporates rules for arranging segments in LBA order.

The LRU ordering rule section (LRU STRING RULE) 68D incorporates rules for arranging segments in LRU order.

The next HDD segment rule section (NXT DSEG RULE) 68E incorporates rules for determining the segment to be used for the next sector of the disk.

The next host segment rule section (NXT HSEG RULE) 68F incorporates rules for determining the segment to be used for the next sector from the host.

The segment handler 36 thus processes request signals output from the host 32 via the I/O 42 and from the memory manager 38 according to the rules incorporated in the rule sections. The priority set section 64 arbitrates if two request signals demand the same sectors.

The basic principles used to establish various rules for efficiently receiving data from the segment memory 46 are described next.

Principle of Inter-segment Exclusion

The same sector data shall not be placed in a plurality of segments.

Principle of Segment Transfer During Execution

A segment to be used can be changed during a process if the sector data of the host 32 request is retained in a plurality of segments.

Figure 7:
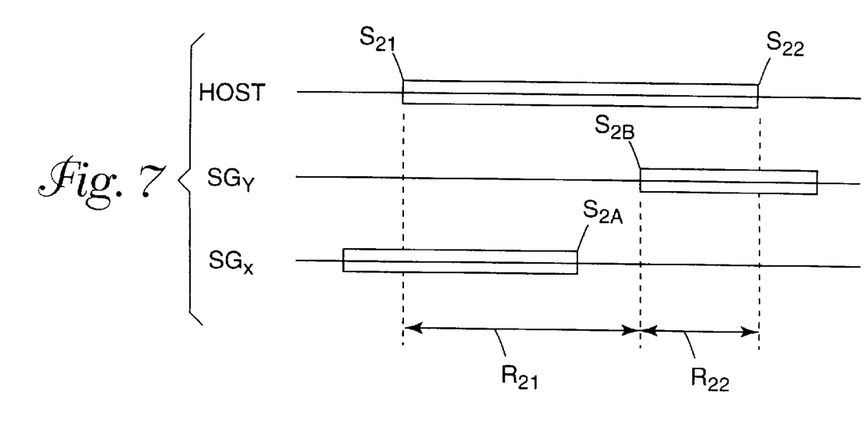
FIG. 7 is a conceptual view of the principle of segment transfer.

Referring now to FIG. 7, a conceptual view describing the principle of segment transfer during execution using data retained in segments in response to a host is shown. For example, if the host issues a read instruction for sectors $S_{21}$ to $S_{22}$ and if part of this data is contained in segments $SG_x$ and $SG_y$, segment $SG_x$ is first set as one to be processed according to the principle of inter-segment exclusion. Since segment $SG_x$ retains the data preceding sector $S_{2A}$, the sector data retained in $SG_x$ (indicated by arrow $R_{21}$) is transferred, and the missing sector data is read from the disk and transferred. When segment $SG_x$ is filled with the data preceding sector $S_{2B}$, processing for segment $SG_x$ stops and the process switches to segment $SG_y$. The data (indicated by arrow $R_{22}$) beginning from sector $S_{2B}$, which is retained in segment $SG_y$, is transferred. This principle corresponds to the dynamic switching of a segment to be processed.

Principle of Segment Ordering

In accordance with the principle of inter-segment exclusion, data is not duplicated in the segment memory. The segments in the segment memory are ordered using the addresses of the sectors (LBA) retained in each segment. This ordering allows the transfer target to be uniquely determined when the process switches to another segment during execution.

Figure 8:
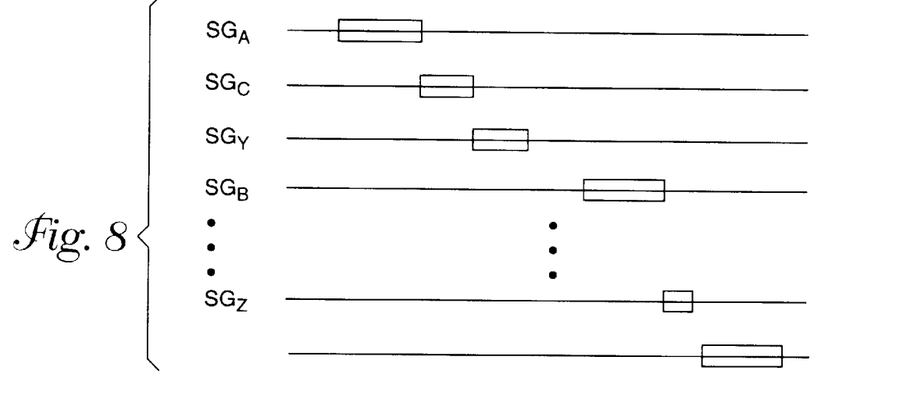
FIG. 8 is a conceptual view of the principle of segment ordering.

Referring now to FIG. 8, a conceptual view describing the principle of segment ordering is shown. Since no segments, $SG_A$–$SG_Z$, share the same data in accordance with the principle of inter-segment exclusion, segments are arranged in LBA order.

Principle of Unwritten Data Protection

The write cache may cause segments to retain unwritten data, and such data must be protected. In response to a host write instruction, if a segment retains unwritten data, the unwritten data is not processed. The process switches to another segment.

Figure 9:
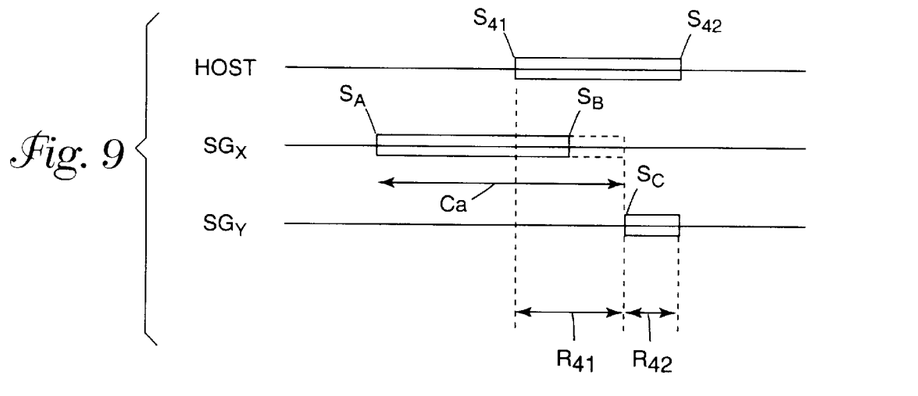
FIG. 9 is a conceptual view of the principle of unwritten data protection.

Referring now to FIG. 9, a conceptual view describing the principle of unwritten data protection is shown. For example, the host issues a read instruction for sectors $S_{41}$ to $S_{42}$, and part of the data is retained in segments $SG_x$ and $SG_y$. Segment $SG_x$, has capacity Ca and retains the data beginning from sectors $S_A$ and ending before $S_B$. The data beginning at sector $S_A$ and ending at $S_{41}$ is unwritten, so it must be protected. Therefore, segment $SG_x$ is first set as one to be processed according to the principle of inter-segment exclusion. The data, which is retained in segment $SG_x$, beginning at sector $S_{41}$ and ending at sector $S_B$ is transferred, while missing sector data is read from the disk up to sector $S_C$, when segment $SG_x$, is filled, and the read data is then transferred. Since segment $SG_x$, is now filled and retains unwritten data, the processing for segment $SG_x$ is stopped and the process switches to segment $SG_y$. This allows the data ending at sector $S_C$ (indicated by arrow $R_{41}$) to be processed using segment $SG_x$, and the data beginning at sector $S_C$ (indicated by arrow $R_{42}$) to be processed using segment $SG_y$, thereby protecting the unwritten data.

Principle of Instruction and Segment Usage

A purpose for the segmentation of the segment memory is to limit segments to be used to prevent an excess amount of data in the segment memory from being destroyed (updated) in response to instructions from a single host. Consequently, in response to a host instruction, once a segment to be used is selected, only the selected segment is subsequently used without deviating from the principles of inter-segment exclusion and unwritten data protection.

Figure 10:
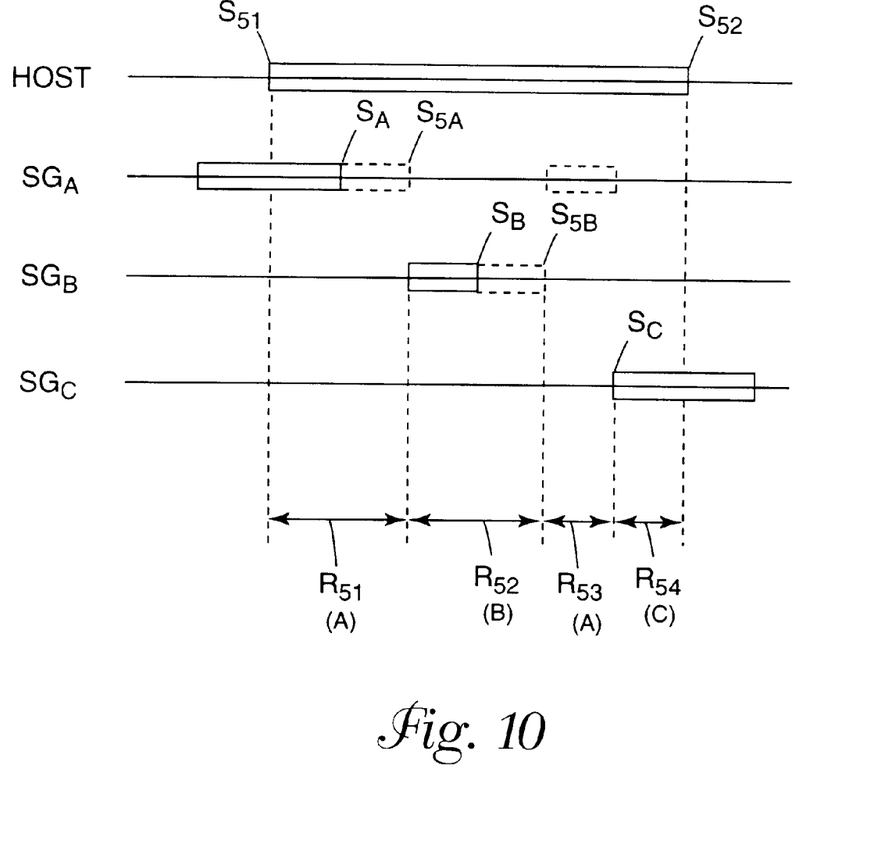
FIG. 10 is a conceptual view of the principle of instruction and segment usage.

Referring now to FIG. 10, a conceptual view describing the principle of instruction and segment usage is shown. For example, the host issues a read instruction for sectors $S_{51}$ to $S_{52}$, and part of the data is retained in segments $SG_A$, $SG_B$, $SG_C$. Segment $SG_A$ is first set as one to be processed according to the principle of inter-segment exclusion. The requested data retained in segment $SG_A$ preceding sector $S_A$ is transferred, while the data beginning at sector $S_A$ and ending before sector $S_{5A}$ (the data in which is retained in segment $SG_B$) is read from the disk using the empty space of segment $SG_A$ and transferred. The processing for segment $SG_A$ then stops, and the process switches to segment $SG_B$. Segment $SG_B$ transfers the data preceding sector $S_B$ and reads the data beginning at sector $S_B$ and ending before sector $SG_{5B}$ using its empty space and then transfers it. When segment $SG_B$ is filled with data, the processing for segment $SG_B$ stops and segment $SG_A$, which was first used, is again set to be processed, without rewriting the data in segment $SG_B$. Segment $SG_A$ reads the data starting from sector $S_{5B}$ and ending before sector $S_C$, which is retained in segment $SG_C$, and then transfers the data. The data starting at sector $S_C$ and ending at sector $S_{52}$ is then transferred. Therefore, the data preceding $S_{5A}$ (indicated by arrow $R_{51}$) is processed using segment $SG_x$. The data beginning at sector $S_{5A}$ and ending at sector $S_{5B}$ (indicated by arrow $R_{52}$) is processed using segment $SG_B$. The data beginning at sector $S_{5B}$ and ending at sector $S_C$ (indicated by arrow $R_{53}$) is processed using segment $SG_A$. The data beginning at sector $S_C$ and ending at sector $S_{52}$ (indicated by arrow $R_{54}$) is processed using segment $SG_C$. Only the data retained in segment $SG_A$ is thus updated, thereby allowing the data in segment $SG_B$ and subsequent segments to be protected without destruction.

The advantages of the HDD system 10 of the present embodiment are described next. The following description is for a read and a write instruction from the host 32.

Read Instruction

When the host 32 issues a read instruction to request data, a segment to be mainly used to serve the instruction is selected. This is accomplished by determining whether or not a segment exists which retains data of the first of the LBAs requested in the read instruction from the host 32. If so, this segment is selected as one to be mainly used according to the principle of inter-segment exclusion. However, if this segment is write-protected (PROTECT FLAG is "∘"), the first segment in the LRU order is selected. If no segment retains data of the first of the LBAs requested by the host, the first segment in the LRU order is selected. The first segment in the LRU order must not be write-protected. If the first segment in the LRU order is write-protected, the process temporarily stops to perform the required processing for the segment (a write to the disk).

A missing LBA (MLBA) is then calculated. The MLBA is the LBA immediately after the last of the LBAs in segments after a selected segment to be mainly used. In calculating the MLBA, the segment retaining the MLBA (MSEG) is determined.

Figure 11A:
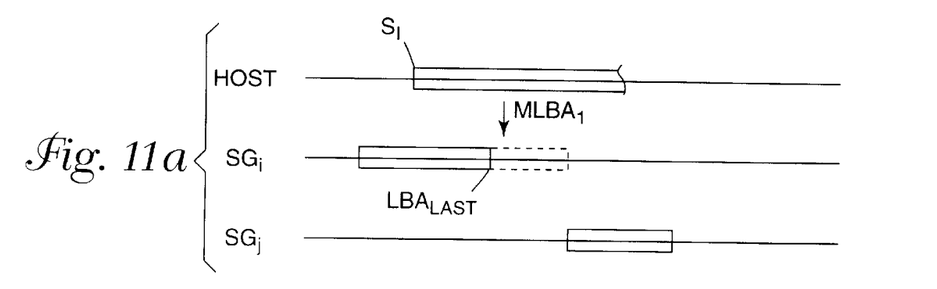
FIGS. 11a and 11b are diagrams illustrating data retention in segments in response to a read instruction.
Figure 11B:
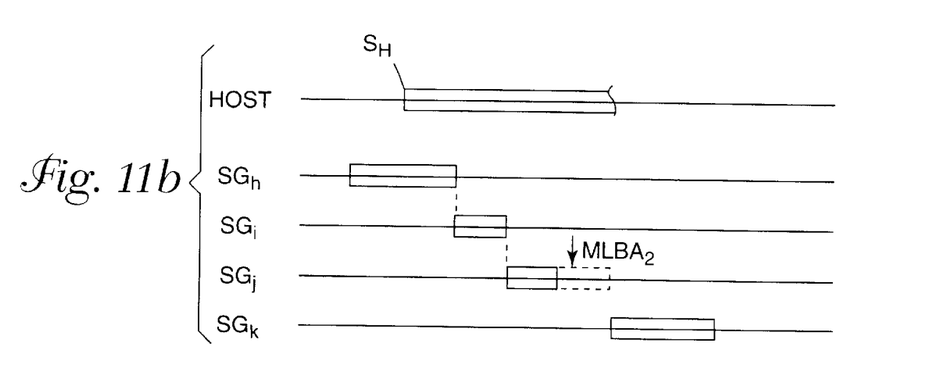

Referring now to FIGS. 11a and 11b, drawings illustrating data retention in segments in response to a read instruction are shown. In FIG. 11a, the host issues a read instruction for sector $S_I$ and subsequent sectors, and part of the data is contained in segments $SG_i$, and $SG_j$. Since missing sector data exists between segment $SG_i$ and segment $SG_j$, the LBA after the $LBA_{LAST}$ of the last sector's data retained in segment $SG_i$ is $MLBA_1$. The determination of $MLBA_1$ allows sector $S_I$ and subsequent sectors retained in segment $SG_i$ to be output, and missing sector data from $MLBA_1$ and subsequent LBAs to be read from the disk and transferred, thereby reducing the processing time.

Referring now to FIG. 11b, in addition, the host issues a read instruction for sector $S_H$ and subsequent sectors, and part of the data is contained in each of a plurality of contiguous segments $SG_h$, $SG_i$, $SG_j$, $SG_k$. Since data is contiguous from segment $SG_h$ to segment $SG_j$ but missing sector data exists between segment $SG_j$ and $SG_k$, the LBA after the $LBA_{LAST}$ of the last sector data retained in segment $SG_j$ is determined as $MLBA_2$.

Data is then transferred. Data with LBAs smaller than the MLBA which is contained in the segment to be mainly used and subsequent segments is transferred to the host 32 because the data is retained contiguously in those segments. LBAs transferred to the host 32 are referred to as HLBAs.

Data is then read from a disk. That is, missing data is read from the disk. In this case, the local CPU (not shown) carries out the reads from the disk, but the HDC 30 automatically issues an signal to suspend the process if a catch up occurs. A catch up includes a host catch up and a disk catch up.

A host catch up occurs during data transfer from a disk to the host, when the rate at which data is read from the disk is lower than the rate at which the data is transferred to the host. If all the read data is transferred, the host catches up with the disk.

A disk catch up occurs during data transfer from a disk to a host, when the rate at which data is read from the disk is higher than the rate at which the data is transferred to the host. If all the segments are filled with data that has not been transferred, the disk catches up with the host.

The segment to be used for a disk is switched according to the above principles. Each time one sector of data is read from a disk, the MLBA is incremented and the segment table is updated accordingly. When the MLBA reaches the lower end of the range of sectors retained in the next segment in the LBA order (LBA RANGE), it indicates the LBA next to the largest of those LBAS which are retained contiguously in subsequent one or more segment.

When all the above processing is finished and all the retained data is transferred, the end of the read instruction is communicated to the host. This communication is executed by the local CPU (not shown).

Write Instruction

When the host 32 issues a write instruction, a segment to be mainly used is selected and an MLBA is calculated, as in the read instruction.

In response to the write instruction, data transfer is immediately started. In this case, the segment to be used for the host 32 data is switched according to the above principles. The NLBA and the segment table are not updated until the HLBA reaches the MLBA. When the HLBA exceeds the MLBA, the MLBA is incremented and the segment table is updated accordingly each time one sector of data is transferred. When the MLBA reaches the lower end of the range of sectors retained by the next segment in the LBA order (LBA RANGE), it then indicates the LBA next to the largest of those LBAs which are retained contiguously in subsequent segments.

The data is then written to a disk. Since the data with LBAs smaller than the HLBA has already been transferred, the data is written to the disk after the seek operation. In this case, the segment to be used is switched according to the above principles.

When the above processing is finished and all the requested data is transferred (write cache), or when all the requested data has been written to the disk, the end of the write instruction is communicated to the host. This communication is executed by the local CPU (not shown).

The operation of the HDC 30 is next described. In FIG. 3, to select a segment, the host 32 outputs an instruction to the I/O 32. The I/O 32 then outputs the segment selection request signal SEGSEL-REQ to the segment handler 36. The segment handler 36 uses the segment selection rule section (SELECTION RULE) 68A of the sequencer 66 to reference the segment table to select a segment for receiving data from the segment memory. If the LBA or LRU order of segments is changed as a result of the selection, the LBA identification code (LBA STRING) and the LRU identification code (LRU STRING) are updated. That is, the LBA ordering request signal (LBASTR-REQ) is output to the LBA ordering rule section (LBA STRING RULE) 68C, while the LRU ordering request signal (LRUSTR-REQ) is issued to the LRU ordering rule section (LRU STRING RULE) 68D. As shown in FIGS. 4 and 5, these request signals are first retained in the request signal holder 62, and after their priority is determined by the priority set section 64, they are input to the LBA ordering rule section (LBA STRING RULE) 68C and the LRU ordering rule section (LRU STRING RULE) 68D of the sequencer 66. In this way, the segment selection rule section (SELECTION RULE) 68A, the LBA ordering rule section (LBA STRING RULE) 68C, and the LRU ordering rule section (LRU STRING RULE) 68D of the sequencer 66 are primarily used to select a segment.

For a data transfer request, the segment handler 36 determines whether or not data can be transferred when the data transfer request signal XFER-REQ (shown in FIG. 3) is output from the I/O 42 after a segment to be used has been selected as described above. This determination is carried out by the transfer rule section (TRANSFER RULE) 68B. If transfer is possible, the segment handler 36 outputs the data transfer enabling signal XFER-ENA to the memory manager 38. On receiving the data transfer enable signal XFER-ENA, the memory manager 38 uses the segment signal SEGMENT describing a segment to be used and an address to be used ADDRESS which are output by the segment handler 36 to prepare for transfer. When the preparation is complete, the memory manager 38 outputs the data transfer acknowledgment signal XFER-ACK to the I/O 42. As soon as the data transfer acknowledgment signal XFER-ACK is input to the I/O 42, the I/O 42 starts to transfer data.

Next, the switching of segments during data transfer is described. When transfer of sector data is started, the memory manager 38 outputs the request signal (NXT-HSEG-REQ) for determining a segment to be used for the next segment of the host. On receiving the request signal (NXT-HSEG-REQ), the segment handler 36 determines a segment to be used in the next host segment rule section (NXT HSEG RULE) 68F by the time the sector data is transferred. Since the segments are ordered in advance, the next segment to which the process switches is the next segment in the LBA order or the segment to be mainly used as described above. If the LBA or the LRU order is changed as a result of switching, an update operation is performed. That is, if data in a segment is changed during data transfer, the memory manager 38, according to this change, outputs to the segment handler 36 the request signal (NXT-DESG-REQ) for determining a segment to be used for the next sector of a disk and the request. signal (NXT-HSEG-REQ) for determining a segment to be used for the next sector of the host to update the LBA, and the LRU orders.

Figure 12A:
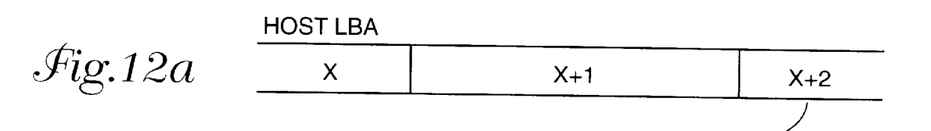
FIGS. 12a, 12b, 12c, and 12d illustrate segment switching timing.
Figure 12B:
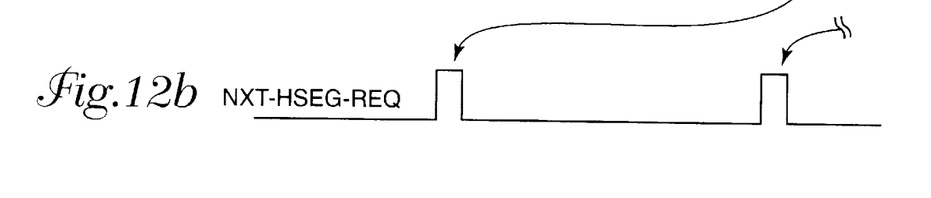
Figure 12C:
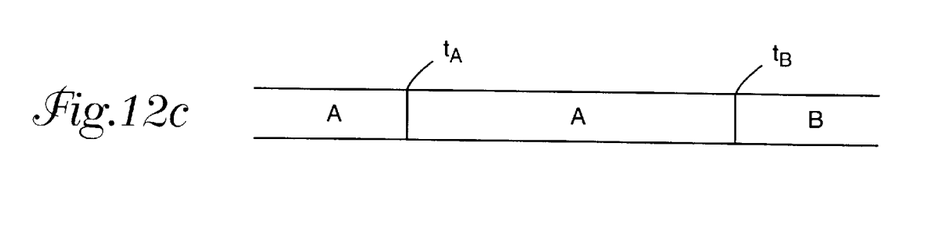
Figure 12D:
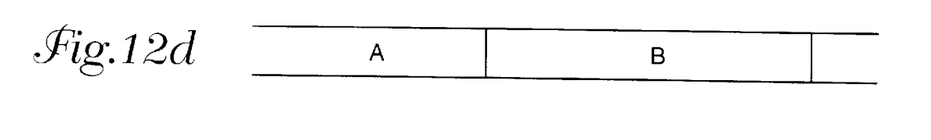

Referring now to FIGS. 12a, 12b, 12c and 12d, a diagram illustrating segment switching timing is shown. In FIG. 12a, the LBAs requested by the host 32 are X, X+1, and X+2. In FIG. 12b, when the process finishes X and switches to X+1, a request signal for X+2, which is next to X+1, that is the request signal (NXT-HSEG-REQ) for determining a segment to be used for the next sector of the host is output. In FIG. 12c, if X and X+1 are retained in segment A, if X+2 is retained in segment B, and if only one of the segments is used during processing, data must be transferred with LBA switching timings $t_A$, $t_B$. In the present embodiment, data is prepared in advance in the segment retaining the next LBA by outputting the request signal (NXT-HSEG-REQ), as shown in FIG. 12d.

Figure 14:
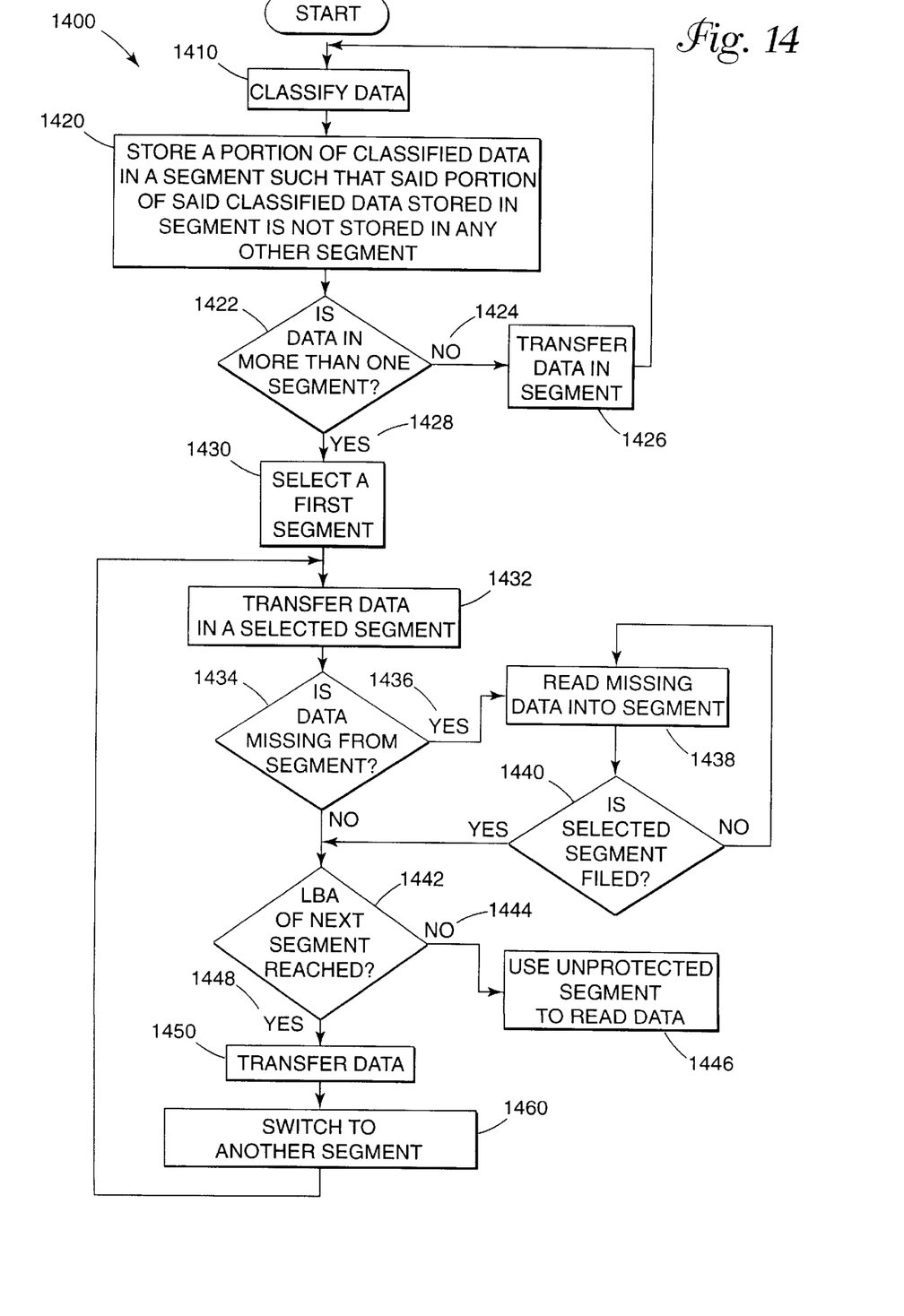
FIG. 14 illustrates a flow chart demonstrating the method 1400 for reading and writing data according to the present invention.

FIG. 14 illustrates a flow chart demonstrating the method 1400 for reading and writing data according to the present invention. First, data having at least one logical block address is classified by using said LBA addresses to identify segments storing said classified data in a sector buffer and dividing said classified data into a plurality of units based on said LBA addresses of said identified segments 1410. Then, a portion of said classified data is stored in a segment such that said portion of said classified data stored in said segment is not stored in any other segment in said sector buffer 1420. A determination is made as to whether said classified data is stored in a plurality of identified segments 1422. If not 1424, the, segment storing the classified data is transferred 1426. If said classified data is stored in a plurality of identified segments 1428, a first segment is selected 1430. Data in the segment is transferred 1432. Then, a determination is made as to whether data is missing in the segment 1434. If yes 1436, the missing data is processed 1438. Missing data is continually processed until the selected segment is filled 1440. Then, a determination is made as to whether the LBA of the next segment is reached 1442. If not 1444, an unprotected segment is used to read the missing data 1446. If the LBA of the next segment is reached 1448, the data is transferred 1450. Finally a next segment is switched to 1460.

As described above, the present embodiment provides a function block operating as a multi-segment cache handler in the HDC that automatically manages data in a plurality of segments using then segment handler based on (1) the principle of inter-segment exclusion, (2) the principle of inter-segment transfer during execution of an instruction, (3) the principle of segment ordering, (4) the principle of unwritten data protection, and (5) the principle of instruction and segment usage. In addition, the data in each segment and the usage of the segments are all managed by the segment table. The HDC thus provides a function block acting as an automatic data transferrer that references the segment table to automatically start or suspend data transfer according to a request from the host.

The presence of the functions of the multi-segment cache handler and the automatic data transferrer within the HDC improves the transfer efficiency of the HDD system and reduces the burden on the software of the local CPU in the HDD system. This results in an HDC constituting an inexpensive and versatile HDD system.

As described above, according to the present invention, the disk drive data processing method prevents at least a portion of the data from being duplicated in the sector buffer. Therefore, the sector buffer is handled efficiently, and the computational load to check for duplicated data is reduced.

By avoiding a check for duplicate data in the sector buffer, the disk drive of the present invention improves data transfer efficiency. If the local CPU controls the disk drive, this invention reduces the computational load on the local CPU due to software processing. Therefore, the present invention provides an inexpensive and versatile disk drive.

Accordingly, it is to be understood that the invention is not to be limited by the specific illustrated embodiments, but only by the scope of the appended claims.

We claim:

1. In a disk drive system comprising a disk for storing data, a head for reading and writing said data on said disk, a sector buffer for storing data read from said disk, said sector buffer also for storing data to be written to said disk, said sector buffer comprising a plurality of segments, said data having at least one logical block address (LBA), a method of reading and writing data comprising the steps of:

classifying said data to identify common missing data portions; and in a segment, retaining data corresponding to the common portion; and storing the missing portion of the classified data in the segment such that said portion of said classified data is not stored in any other segment in said sector buffer.

2. A disk drive system comprising:

a disk for storing data;

a head for reading and writing said data on said disk;

a sector buffer for storing data read from said disk, said sector buffer also for storing data to be written to said disk, said sector buffer comprising a plurality of segments, said data having at least one logical block address (LBA), and a controller for classifying said data to identify common and missing portions, in a segment; retaining data corresponding to the common portion and storing the missing portion of the classified data in the segment such that said missing portion of said classified data is not stored in any other segment in said sector buffer.

3. A disk drive system, comprising:

a disk for storing data;

an actuator arm having a magnetic head in communication with said disk, said magnetic head for reading data from said disk, said magnetic head also for writing data to said disk;

a sector buffer for storing data read from said disk, said sector buffer also for storing data to be written to said disk, said sector buffer comprising a plurality of segments, said data having at least one logical block address; and a controller for classifying said data to identify common and missing portions, in a segment, retaining data corresponding to the common portion and storing the missing portion of the classified data in the segment such that said missing portion of said classified data is not stored in any other segment in said sector buffer.

4. A computer program product for a disk drive system, said computer program product comprising:

a computer usable medium having computer readable program code means embodied in said medium causing data to be stored in a sector buffer, said sector buffer having a plurality of segments said sector buffer for storing data read by a head from a disk in a disk drive system, said sector buffer also for storing data to be written by said head to said disk in said disk drive system, said computer program product including:

computer readable first program code means for classifying said data to identify common and missing portions; and computer readable second program code means for retaining in a segment data corresponding to the common portion and storing the missing portion of the classified data in the segment such that said missing portion of said classified data is not stored in any other segment in said sector buffer.

* * * * *

UNITED STATES PATENT AND TRADEMARK OFFICE
CERTIFICATE OF CORRECTION

PATENT NO. : 6,092,145
DATED : July 18, 2000
INVENTOR(S) : Yuji Kigami, Kohji Yamada, Toshio Kanai and Kazuyuki Ishibashi It is certified that error appears in the above-identified patent and that said Letters Patent is hereby corrected as shown below:

<u>Title page,</u>
Item [56], References Cited, U.S. PATENT DOCUMENTS, replace the Inventor's last name "Begausoleil" with -- Beausoleil --; and replace the subclass "447" with -- 445 --.

<u>Column 11,</u>
Line 49, replace "NLBA" with -- MLBA --.

<u>Column 14,</u>
Line 9, add the word -- and -- after the word "common";
Line 10, delete the word "and";
Line 14, add the word -- missing -- before the word -- portion --.

Signed and Sealed this

Sixth Day of May, 2003

JAMES E. ROGAN
*Director of the United States Patent and Trademark Office*